(12) United States Patent
Todaka et al.

(10) Patent No.: US 8,353,462 B2
(45) Date of Patent: Jan. 15, 2013

(54) THERMALLY ACTUATED HOT AND COLD WATER MIXING VALVE CONFIGURED TO MINIMIZE VALVE HUNTING

(75) Inventors: Kensaku Todaka, Kitakyushu (JP); Hideyuki Matsui, Kitakyushu (JP); Eiji Seki, Kiyose (JP); Isao Negishi, Kiyose (JP)

(73) Assignees: Toto Ltd., Kitakyushu-shi, Fukuoka (JP); Nippon Thermostat Co., Ltd., Tokyo (JP)

( * ) Notice: Subject to any disclaimer, the term of this patent is extended or adjusted under 35 U.S.C. 154(b) by 894 days.

(21) Appl. No.: 12/517,938

(22) PCT Filed: Dec. 5, 2007

(86) PCT No.: PCT/JP2007/073485
§ 371 (c)(1),
(2), (4) Date: Jun. 5, 2009

(87) PCT Pub. No.: WO2008/069233
PCT Pub. Date: Jun. 12, 2008

(65) Prior Publication Data
US 2010/0314457 A1 Dec. 16, 2010

(30) Foreign Application Priority Data
Dec. 6, 2006 (JP) .................................. 2006-329109

(51) Int. Cl.
*G05D 23/02* (2006.01)
(52) U.S. Cl. .................. 236/12.11; 236/12.1; 236/12.16; 236/12.23; 236/93 R; 236/101 A; 236/101 R; 236/102

(58) Field of Classification Search .............. 222/145.6; 137/896; 236/12.1, 12.11, 12.16, 12.23, 236/93 R, 101 A, 101 R, 102
See application file for complete search history.

(56) References Cited

U.S. PATENT DOCUMENTS
5,579,992 A 12/1996 Masatoshi et al.
(Continued)

FOREIGN PATENT DOCUMENTS
EP 0666442 A1 12/1993
(Continued)

OTHER PUBLICATIONS
International Search Report of PCT/JP2007/073485, date of mailing Mar. 18, 2008.

*Primary Examiner* — Cheryl J Tyler
*Assistant Examiner* — Jonathan Bradford
(74) *Attorney, Agent, or Firm* — Westerman, Hattori, Daniels & Adrian, LLP

(57) ABSTRACT

A hot and cold water mixing valve including a temperature adjusting dial, and a cylindrical casing having formed therein a hot water inlet and a cold water inlet is provided with a control valve member in which one end thereof is subjected to a load from a biasing member and the other end is subjected to a load from an actuator. By balancing between the loads applied by the biasing member and the actuator, a mixture ratio between the hot water which flows in through the hot water inlet and the cold water which flows in through the cold water inlet is adjusted. A temperature adjuster adjusts a position of the control valve member through the biasing member and includes a tapered skirt portion, which spreads in a radial direction, at an end on the control valve member side thereof.

4 Claims, 7 Drawing Sheets

U.S. PATENT DOCUMENTS

| | | |
|---|---|---|
| 5,738,275 A | 4/1998 | Enoki et al. |
| 5,806,761 A | 9/1998 | Enoki et al. |
| 2005/0056708 A1 * | 3/2005 | Castillo Higareda ......... 239/337 |

FOREIGN PATENT DOCUMENTS

| | | |
|---|---|---|
| JP | 1-320387 A | 12/1989 |
| JP | 06-235479 A | 8/1994 |
| JP | 9-42493 A | 2/1997 |
| JP | 2006-307971 A | 11/2006 |
| WO | 94/15129 A1 | 7/1994 |
| WO | WO 2005068799 A1 * | 7/2005 |
| WO | 2006/117903 A1 | 11/2006 |

* cited by examiner

THERMALLY ACTUATED HOT AND COLD WATER MIXING VALVE CONFIGURED TO MINIMIZE VALVE HUNTING

TECHNICAL FIELD

The present invention relates to a technology of a hot and cold water mixing valve.

BACKGROUND ART

Conventionally, a hot and cold water mixing valve has been used for controlling a temperature of a mixture of hot and cold water by biasing a movable valve member for changing a mixture ratio of hot water to cold water by means of a spring made of a shape memory alloy whose spring constant changes with temperature. Such a hot and cold water mixing valve is disclosed in Patent Document 1, for example.

Patent Document 1 discloses a hot and cold water mixing valve which uses a spring made of a shape memory alloy as a temperature sensitive actuator, and is arranged such that mixed water passes outside the spring made of the shape memory alloy. Further, Patent Document 1 discloses a structure where a seat surface part to which a generation load is applied is formed at one end of the spring made of the shape memory alloy and a movable valve member is moved according to a motion of the seat surface part.

Now, a structure of the above-mentioned conventional hot and cold water mixing valve will be described with reference to FIG. 1. A hot and cold water mixing apparatus W as shown is provided with a cylindrically formed casing 1, an adjustment screw 3 threadedly engaged with one end part of the casing 1, and a plug 12 threadedly engaged with the other end side of the casing 1.

A hot water inlet a and a cold water inlet b are opened axially in parallel at a side wall of the casing 1. A hot water inflow pipe 10 for conducting hot water and a cold water inflow pipe 11 for conducting cold water are connected to them. Further, the control valve member 2 formed in the shape of a cylinder or in the shape of a spool is movably fitted into the casing 1 in an axial direction. A conventional biasing member 4 which is supported by the adjustment screw 3 threadedly engaged with one end part of the casing 1 and has a fixed spring constant with respect to temperature is abutted against one axial end of the control valve member 2. Further, the temperature sensitive spring 5 which is supported by the plug 12 threadedly engaged with the other end side of the casing 1 and which is made of a metal or synthetic resin material whose spring constant changes with temperature is abutted against the other axial end of the control valve member 2. The control valve member 2 is held in a situation of being balanced between the temperature sensitive spring 5 and the above-mentioned biasing member 4.

The casing 1 has provided therein a mixing chamber 13 for mixing the hot water which flows in through the hot water inlet a with the cold water which flows in through the cold water inlet b, and a discharge room 14 for conducting a mixture of water mixed in the mixing chamber 13 to a mixed water outlet c provided for the casing 1. Further, the control valve member 2 has formed and provided therein a hot water valve 2a and a cold water valve 2b facing the hot water valve seat 10a and the cold water valve seat 10b which are formed and provided at mouth edges of the hot water inlet a and the cold water inlet b.

Thus, in a situation where it is set as a desired preset temperature by means of the adjustment screw 3, if a flow rate of the cold water which flows in decreases with decreasing hydraulic pressure etc. and the temperature of the mixed water in the mixing chamber 13 rises accordingly, then the temperature sensitive spring 5 which detects it may operate to increase the generation load. When the temperature sensitive spring 5 operates to increase the generation load, it pushes and contracts the biasing member 4 to move the control valve member 2 to the left, narrows a spacing between the hot water valve 2a and the hot water valve seat 10a to lower a valve lift of the hot water inlet a, reduces an inflow rate of the hot water to lower the temperature of the mixed water, and at the same time stabilizes the control valve member 2 in a position where the mixture ratio between the hot water and the cold water of the mixed water and the temperature of the mixed water are balanced.

Further, when the flow rate of the cold water which flows in increases with increasing hydraulic pressure etc. and the temperature of the mixed water in the mixing chamber 13 falls, the temperature sensitive spring 5 operates to reduce the generation load by its detection operation. When the temperature sensitive spring 5 operates to reduce the generation load, the biasing member 4 expands by the reduced load so as to move the control valve member 2 to the right, and narrows the spacing between the cold water valve 2b and the cold water valve seat 10b so as to lower a valve lift of the cold water inlet b and reduce the flow rate of the incoming cold water. In this way, the temperature of the mixed water which has fallen is raised so that the control valve member 2 is stabilized in the position where the mixture ratio of the hot water to the cold water and the temperature of the mixed water are balanced and the temperature of the discharging mixed water is held at the setup temperature.

Patent Document 1: Japanese Patent Application Publication No. 2006-307971

DISCLOSURE OF THE INVENTION

Object of the Invention

Incidentally, in the conventional hot and cold water mixing valve as described above, the mixture of the hot water and water having been insufficiently mixed may reach around the temperature sensitive spring depending on pressure magnitudes of the hot water and cold water flowing into the hot and cold water mixing valve. Further, since the temperature sensitive spring used for the conventional hot and cold water mixing valve has a good response to temperature changes, if the insufficiently mixed water passes by the temperature sensitive spring, expansion/shrink operation takes place frequently according to the temperature changes of the temperature sensitive spring. As a result, a hunting phenomenon occurs and the stable temperature control may not be carried out.

In addition, it is possible to reserve sufficient space for mixing the hot water and cold water inside the hot and cold water mixing valve. However, as for the hot and cold water mixing valve, the size of the equipment itself is limited in view of installation environment etc. Therefore, it is difficult to sufficiently reserve the space for mixing the hot water and cold water inside the hot and cold water mixing valve.

The present invention arises in view of the above-mentioned situations, and an aim of the present invention is to realize high-precision temperature control in the hot and cold water mixing valve, and prevent the hunting phenomenon from taking place.

Means to Solve the Problems

A hot and cold water mixing valve in accordance with the present invention for solving the above-mentioned problems is provided with a temperature adjusting dial which is subjected to temperature control operation, and a main body member having a control valve mechanism for adjusting temperatures of hot water and cold water by operating the above-mentioned temperature adjusting dial and a casing in which a hot water inlet and a cold water inlet are formed and the above-mentioned control valve mechanism is accommodated.

Further, the above-mentioned main body member includes a biasing member made of a material having a fixed spring constant, an actuator which expands or shrinks according to a temperature change, a control valve member in which one end is subjected to a load from the above-mentioned biasing member and the other end is subjected to a load from the above-mentioned actuator, and an opening/closing ratio between the above-mentioned hot water inlet and the above-mentioned cold water inlet is changed by balancing between the loads applied by the above-mentioned biasing member and the above-mentioned actuator, to adjust a mixture ratio between the hot water which flows in through the above-mentioned hot water inlet and the cold water which flows in through the above-mentioned cold water inlet, and a temperature adjusting means whose one side is fixed to the above-mentioned temperature adjusting dial and whose other side is abutted against the above-mentioned biasing member which biases the above-mentioned control valve member, to apply a load to the above-mentioned control valve member according to rotation of the above-mentioned temperature adjusting dial, and to set up a position of the above-mentioned control valve member, as well as a mixing chamber for mixing the cold water from the above-mentioned cold water inlet and the hot water from the above-mentioned hot water inlet is provided inside the above-mentioned casing, and the above-mentioned actuator is arranged in the above-mentioned mixing chamber, and an end on the above-mentioned control valve member side of the above-mentioned temperature adjusting means is provided between the above-mentioned hot water inlet and the above-mentioned mixing chamber, and spreads in a radial direction so that a channel area between the above-mentioned hot water inlet and the above-mentioned mixing chamber may be reduced.

As such, in the hot and cold water mixing valve of the present invention, the end on the control valve member side of the temperature adjusting means is provided between the hot water inlet and the mixing chamber, and spreads in a radial direction so that the channel area between the hot water inlet and the above-mentioned mixing chamber may be reduced. Therefore, according to the present invention, an obstacle is provided for the hot water passage, from the hot water inlet to the mixing chamber. In other words, the above-mentioned structure allows turbulence to take place before mixing the hot and cold water. Accordingly, subsequent mixing of the hot and cold water is promoted. As a result, a detection temperature of the actuator can be obtained appropriately.

Further, according to the present invention, it is possible to reduce force (pressure) of the hot water flowing toward the mixing chamber due to the shape of the end on the control valve member side of the temperature adjusting means. Therefore, according to the present invention, even if the pressure of the hot water which flows in through the hot water inlet rises rapidly, it is possible to shorten a travel distance with which the control valve member may widen the cold water valve side (temperature control can be performed in a short time), because the increase in the flow rate of the hot water which flows into the mixing chamber is controlled by the end on the control valve member side of the above-mentioned temperature adjusting means. In other words, according to the present invention, it is possible to reduce the influence by fluctuations in hot water pressure, thus improving temperature control performances.

Further, it is possible to limit the flow rate of the hot water which flows into the mixing chamber due to the shape of the end on the control valve member side of the above-mentioned temperature adjusting means. Accordingly, since an area between the end on the control valve member side of the above-mentioned temperature adjusting means and a casing inner-wall is fixed, and since the hot water of a predetermined flow rate or more does not flow into the mixing chamber, it is possible to prevent sudden operation of the actuator due to the rapid increase in the flow rate of the hot water, even if the hot water pressure rises rapidly. Thus, according to the present invention, the hunting in which overshoot and undershoot are repeated may not occur easily, to thereby improve the accuracy in temperature control.

Further, in the above-mentioned hot and cold water mixing valve, it is desirable that the end on the above-mentioned control valve member side is a tapered skirt portion which spreads in a radial direction gradually from the above-mentioned hot water inlet toward the above-mentioned mixing chamber. By providing the skirt portion from the hot water inlet to the mixing chamber in this way, it is possible to cause turbulence before mixing the hot and cold water. Accordingly, subsequent mixing of the hot and cold water is promoted. As a result, a detection temperature of the actuator can be obtained appropriately.

Further, by providing the skirt portion which causes effluent resistance (pressure loss) from the hot water inlet to the mixing chamber, it is possible to reduce the force (pressure) of the hot water flowing toward the mixing chamber. Therefore, according to the present invention, even if the pressure of the hot water which flows in through the hot water inlet rises rapidly, it is possible to shorten a travel distance with which the control valve member may widen the cold water valve side (temperature control can be performed in a short time), because the increase in the flow rate of the hot water which flows into the mixing chamber is controlled by the skirt portion. In other words, according to the present invention, by providing the skirt portion which causes effluent resistance (pressure loss), it is possible to reduce the influence by fluctuations in hot water pressure, thus improving temperature control performances.

Further, the skirt portion can limit the flow rate of the hot water which flows into the mixing chamber. Accordingly, since an area between a tip portion of the skirt portion and the casing wall is fixed, and since the hot water of a predetermined flow rate or more does not flow into the mixing chamber, it is possible to prevent sudden operation of the actuator due to the rapid increase in the flow rate of the hot water, even if the hot water pressure rises rapidly. Thus, according to the present invention, the hunting in which overshoot and undershoot are repeated may not occur easily, to thereby improve the accuracy in temperature control.

A hot and cold water mixing valve in accordance with the present invention for solving the above-mentioned problems is provided with a temperature adjusting dial which is subjected to temperature control operation, and a main body member having a control valve mechanism for adjusting temperatures of hot water and cold water by operating the above-mentioned temperature adjusting dial and a casing in which a hot water inlet and a cold water inlet are formed and the above-mentioned control valve mechanism is accommodated.

Further, the above-mentioned main body member includes a biasing member made of a material having a fixed spring constant, a temperature sensitive spring which expands or shrinks according to a temperature change, and a control valve member in which a first spring bracket for supporting the above-mentioned biasing member is abutted against one end, and a second spring bracket for supporting the above-mentioned temperature sensitive spring is abutted against the other end, and an opening/closing ratio between the above-mentioned hot water inlet and the above-mentioned cold water inlet is changed by balancing between the loads applied by the above-mentioned biasing member and the above-mentioned temperature sensitive spring, to adjust a mixture ratio between the hot water which flows in through the above-mentioned hot water inlet and the cold water which flows in through the above-mentioned cold water inlet, as well as a mixing chamber for mixing the cold water from the above-mentioned cold water inlet and the hot water from the above-mentioned hot water inlet is provided inside the above-mentioned casing, a third spring bracket for supporting the above-mentioned temperature sensitive spring is formed in the above-mentioned mixing chamber, the above-mentioned temperature sensitive spring is constituted by a coil-like large diameter coil spring wound to have a large diameter and a coil-like small diameter coil spring wound to have a small diameter, the above-mentioned large diameter coil spring and the above-mentioned small diameter coil spring are arranged so that their axes are coaxial or in parallel, and supported between the above-mentioned second spring bracket and third spring bracket, a cylindrical cover surrounding a perimeter side of the above-mentioned small diameter coil spring is formed integrally or substantially integrally with the above-mentioned second spring bracket or the third spring bracket, and the perimeter side of the above-mentioned small diameter coil spring is enclosed with the cover on an inner circumference side of the above-mentioned large diameter coil spring, whereby a response of expansion/shrink operation according to the temperature change of the above-mentioned large diameter coil spring and a response of expansion/shrink operation according to the temperature change of the above-mentioned small diameter coil spring are differentiated.

According to this structure, the large diameter coil spring which is not covered operates first to bring the control valve member closer to a predetermined position, and then the control valve member is located and positioned in a predetermined position correctly by operation of the small diameter coil spring which is covered. In other words, fine tuning of the position of the control valve member is performed by the small diameter coil spring. Therefore, according to this structure, there is no hunting etc. and exact control can be attained.

Furthermore, since the above-mentioned structure allows the load of the temperature sensitive spring to be distributed between an inner side and the outside, it is possible to improve the strength of the spring bracket with which the temperature sensitive spring is supported.

Further, in the above-mentioned hot and cold water mixing valve, it is desirable that the above-mentioned second spring bracket and the above-mentioned cover are formed of a resin material.

By constructing in this way, thermal conductivity of the inner temperature sensitive spring can be differentiated from that of the outer temperature sensitive spring. Further, since the resin material can be varied in physical properties (thermal conductivity etc.) depending on the material, using the resin material provides the greater degree of freedom in designing compared with a metal whose physical properties are limited.

A hot and cold water mixing valve in accordance with the present invention for solving the above-mentioned problems is provided with a temperature adjusting dial which is subjected to temperature control operation, and a main body member having a control valve mechanism for adjusting temperatures of hot water and cold water by operating the above-mentioned temperature adjusting dial and a casing in which a hot water inlet and a cold water inlet are formed and the above-mentioned control valve mechanism is accommodated.

Further, the above-mentioned main body member includes a biasing member made of a material having a fixed spring constant, a temperature sensitive spring which expands or shrinks according to a temperature change, and a control valve member in which one end is subjected to a load from the above-mentioned biasing member and the other end is subjected to a load from the above-mentioned temperature sensitive spring, and an opening/closing ratio between the above-mentioned hot water inlet and the above-mentioned cold water inlet is changed by balancing between the loads applied by the above-mentioned biasing member and the above-mentioned temperature sensitive spring, to adjust a mixture ratio between the hot water which flows in through the above-mentioned hot water inlet and the cold water which flows in through the above-mentioned cold water inlet, as well as a valve seat holding portion is formed at one end of the above-mentioned casing, the above-mentioned valve seat holding portion is provided with a cylindrical portion, a disk-shaped spring bracket which is arranged on a tip portion side of the above-mentioned cylindrical portion and in an axial center part of the above-mentioned casing, a rib which extends in the diameter direction of the above-mentioned spring bracket and is connected with the above-mentioned cylindrical portion, and a plurality of holes formed on the perimeter side of the above-mentioned spring bracket, a mixing chamber which is communicated with the above-mentioned hot water inlet and the above-mentioned cold water inlet is formed inside one end of the above-mentioned casing, mixed water mixed in the above-mentioned mixing chamber is discharged from the above-mentioned holes, the above-mentioned temperature sensitive spring is supported by the above-mentioned spring bracket, and a distance of a gap between the tip portion of the above-mentioned cylindrical portion and a bottom of the above-mentioned spring bracket is arranged to be substantially the same as a height of a surface which supports the temperature sensitive spring of the above-mentioned spring bracket.

As such, according to the present invention, the distance of the gap between the tip portion of the cylindrical portion of the valve seat holding portion and the bottom of the above-mentioned spring bracket is arranged to be substantially the same as the height of the surface which supports the temperature sensitive spring of the above-mentioned spring bracket.

This structure allows the mixed water to pass by the end of the temperature sensitive spring and then to be discharged. In other words, according to this structure, it is possible to prevent the mixed water from being discharged from the hot and cold water mixing valve except that its temperature is not detected by the temperature sensitive spring. In this way, it is possible to sufficiently secure time for temperature sensitive spring to detect a temperature, and improve the accuracy of the temperature control. Further, it is possible to adjust the temperature detecting time etc. by changing the length of the tip portion.

Further, a hot and cold water mixing valve in accordance with the present invention for solving the above-mentioned problems is provided with a temperature adjusting dial which is subjected to temperature control operation, and a main body member having a control valve mechanism for adjusting temperatures of hot water and cold water by operating the above-mentioned temperature adjusting dial and a casing in which a hot water inlet and a cold water inlet are formed and the above-mentioned control valve mechanism is accommodated.

Furthermore, the hot and cold water mixing valve is provided with a control valve member including a cylindrical valve portion which is incorporated inside the above-mentioned casing and movable in an axial direction of the above-mentioned casing and has a hot water valve formed at its one end edge and a cold water valve formed at its other end edge, and a cylindrical shaft portion formed in the axial center part of the above-mentioned valve portion, a first spring bracket abutting against one end of the cylindrical shaft portion of the above-mentioned control valve member, a second spring bracket abutting against the other end of the cylindrical shaft portion of the above-mentioned control valve member, a biasing member which is supported by the above-mentioned first spring bracket and biases the above-mentioned control valve member through the above-mentioned first spring bracket, a temperature sensitive spring which is supported by the above-mentioned second spring bracket, and biases the above-mentioned control valve member through the above-mentioned second spring bracket, and a support member which is arranged in the axial center part of the above-mentioned casing, and supports the first spring bracket, the above-mentioned control valve member, and the above-mentioned second spring bracket, as well as the above-mentioned control valve member adjusts a spacing between the above-mentioned hot water valve and the above-mentioned hot water valve seat and a spacing between the above-mentioned cold water valve and the above-mentioned cold water valve seat by balancing between a load applied through the above-mentioned first spring bracket and a load applied through the above-mentioned second spring bracket, and an abutment surface (abutting the above-mentioned first spring bracket) of the cylindrical shaft portion of the above-mentioned control valve member, and/or an abutment surface (abutting the above-mentioned second spring bracket) of the cylindrical shaft portion of the above-mentioned control valve member are subjected to a process of reducing a contact area.

As such, in the present invention, the abutment surface (abutting the above-mentioned first spring bracket) of the cylindrical shaft portion of the above-mentioned control valve member, and/or the abutment surface (abutting the above-mentioned second spring bracket) of the cylindrical shaft portion of the above-mentioned control valve member are subjected to the process of reducing the contact area. The reason for employing this structure is to solve the following problems.

As for the hot and cold water mixing valve, the support member may incline in the case where the control valve member is subjected to opening/closing operation. As the support member inclines, the control valve member supported by the support member, the first spring bracket, and the second spring bracket also incline accordingly. Further, the control valve member is subjected to the load from the biasing member through the first spring bracket and subjected to the load from the temperature sensitive spring through the second spring bracket. If the first spring bracket or the second spring bracket inclines, it is subjected to the load in the inclined direction. In other words, as the support member inclines, the control valve member 2 not only inclines associated with the inclination but also is influenced by the loads from the first spring bracket and the second spring bracket.

The hot and cold water mixing valve has a problem that, in the case where the hot water valve seat (or cold water valve seat) is closed, when the control valve member is subjected to the loads, in the inclined direction, from the first spring bracket and the second spring bracket, the hot water valve (or cold water valve) may not abut evenly against the hot water valve seat (or cold water valve seat), thus causing hot water leakage (or cold water leakage).

Then, the present invention employs the above-mentioned structure, so that an area where the control valve member is in abutment with the first spring bracket and an area where the control valve member is in abutment with the second spring bracket may be arranged to be small, so as to reduce the effects caused by inclination of the support member of the control valve member. In addition, since motion of the control valve member is limited by an inner circumference face of the casing, it is not influenced, even if the support member inclines and the spring brackets (first spring bracket, second spring bracket) incline.

The process of reducing the contact area applied to the abutment surface (abutting the above-mentioned first spring bracket) of the cylindrical shaft portion of the above-mentioned control valve member, and/or the abutment surface (abutting the above-mentioned second spring bracket) of the cylindrical shaft portion of the above-mentioned control valve member may be carried out by beveling the perimeter portions of the abutment surfaces, for example. This beveling includes beveling the perimeter portion (corner portion) of the abutment surface as a plane and also beveling the perimeter portion (corner portion) of the abutment surface as a curved surface. Further, the abutment surface (abutting the above-mentioned first spring bracket) of the cylindrical shaft portion of the above-mentioned control valve member, and/or the abutment surface (abutting the above-mentioned second spring bracket) of the cylindrical shaft portion of the above-mentioned control valve member may be molded beforehand in the shape which allows the contact areas to be reduced.

Thus, according to the present invention, when closing the hot water valve seat (or cold water valve seat), a possibility that the hot water leakage (or cold water leakage) may occur can be reduced.

Effect of the Invention

Thus, according to the hot and cold water mixing valve of the present invention, it is possible to prevent hunting and improve the accuracy of temperature control.

DESCRIPTION OF REFERENCE SIGNS

W—hot and cold water mixing valve
a—hot water inlet
b—cold water inlet
c—mixed water outlet
1—casing
1a—cylindrical main body
1b—cover member
1c—valve seat member
1d—middle case component
10—hot water inflow pipe
10a—hot water valve seat
10b—cold water valve seat
11—cold water inflow pipe
12—plug
13—mixing chamber
14—discharge room
15—male screw
16—female screw
17—protection board
18—guide hole
19—spline slot
2—control valve member
2a—hot water valve
2b—cold water valve
20—cylindrical shaft portion
3—adjustment screw
4—biasing member (bias spring)
5—temperature sensitive spring
5a—large diameter coil spring
5b—small diameter coil spring
6—support member
50—outer casing
60, 61, 62—holding members
7—cover
70, 71—spring brackets
72, 73—spring brackets
8—adjusting screw
9—adjusting screw shaft
90, 91—abutment portions
92—male screw
93—hole
94—skirt portion
170—valve seat holding portion
300—ring member
700—spring holder
900—adjusting screw shaft
1000—cylindrical portion

BEST MODE FOR IMPLEMENTING THE INVENTION

Hereafter, the preferred embodiments of the present invention will be described with reference to the drawings.

Firstly, a first preferred embodiment of the present invention will be described with reference to FIG. 2.

Figure 1:
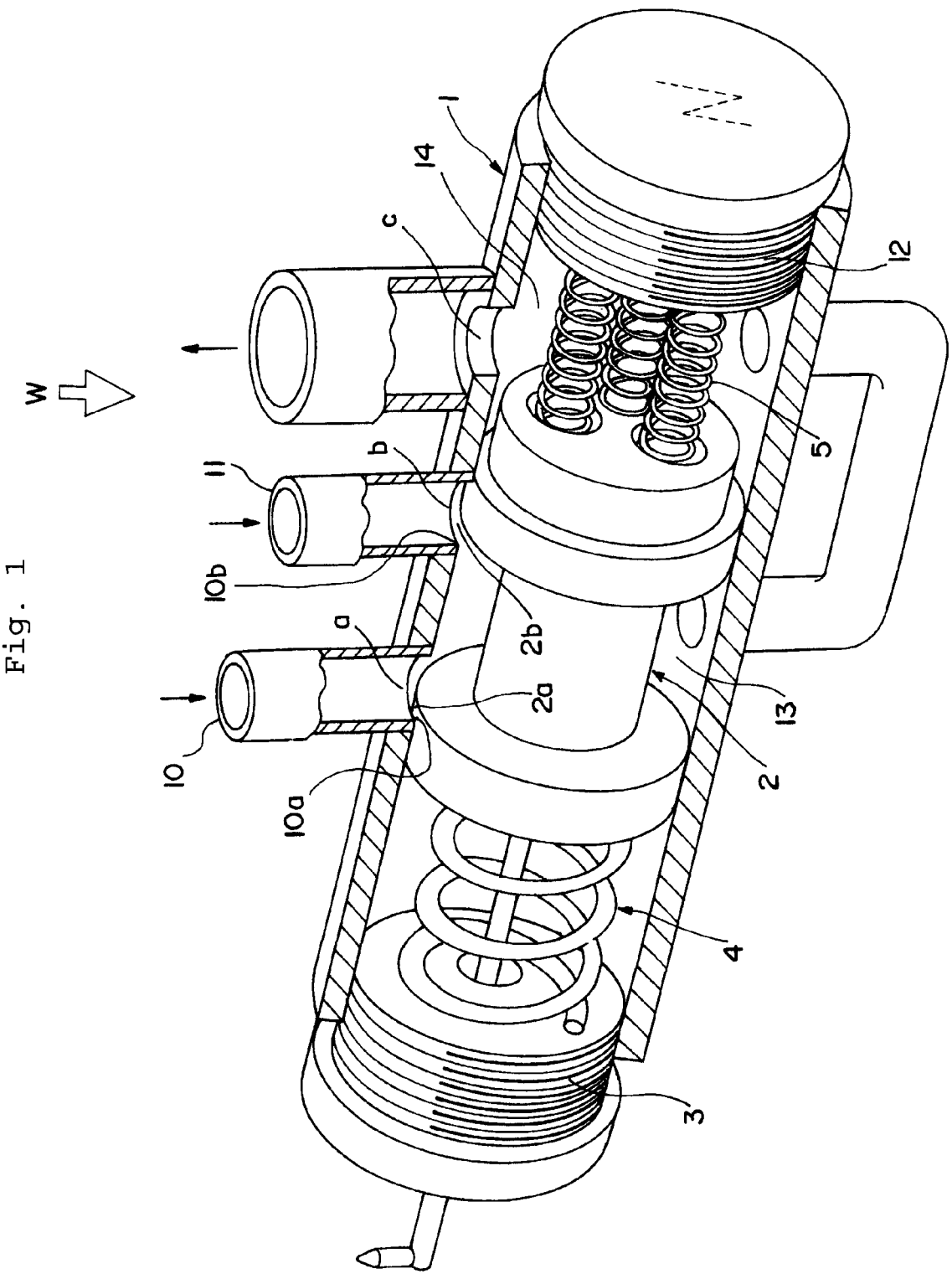
FIG. 1 A perspective view part cut away of a hot and cold water mixing valve using a shape memory alloy for a conventional temperature sensitive spring.
Figure 2:
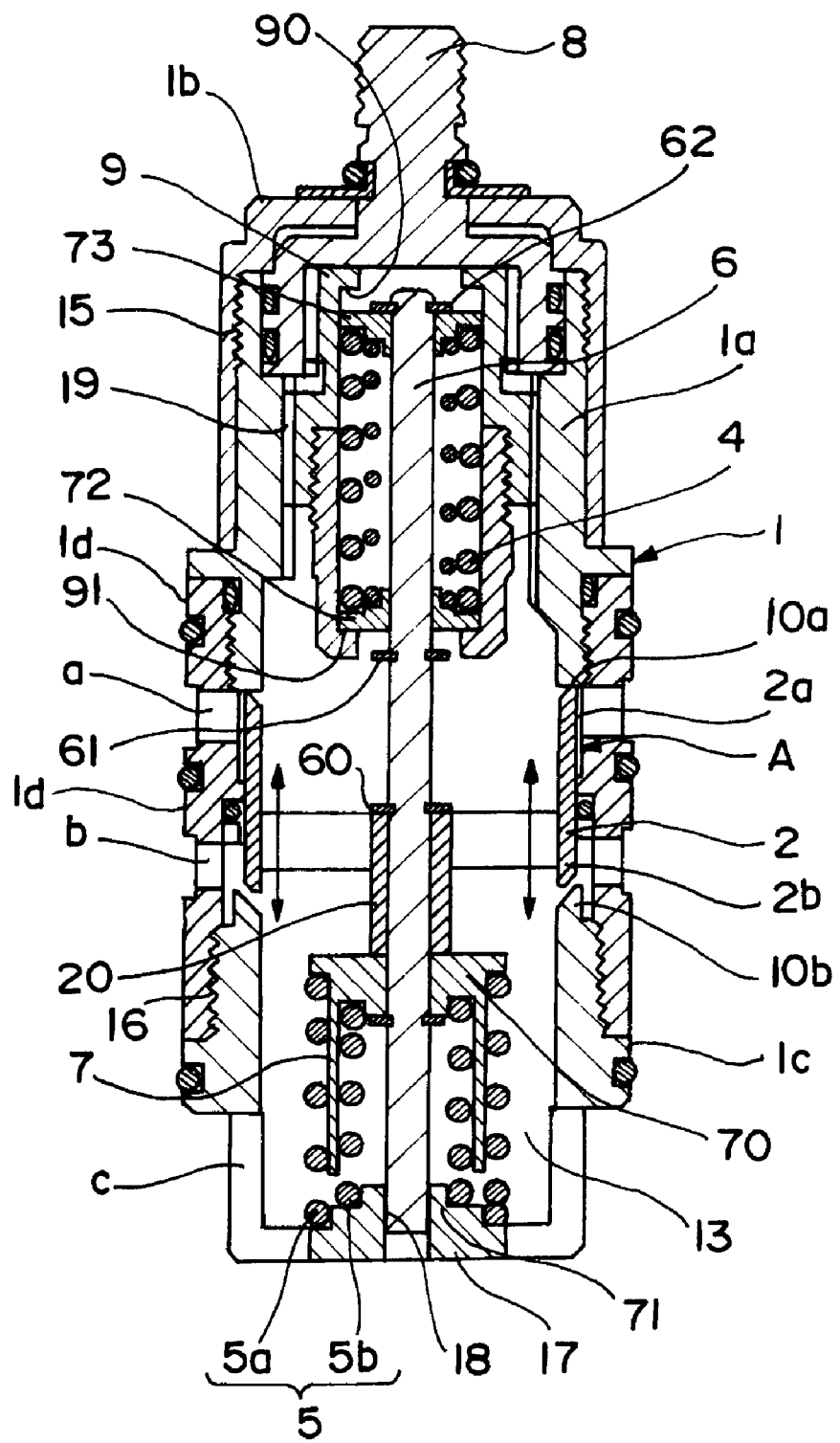
FIG. 2 A longitudinal sectional front view of a control valve member of the hot and cold water mixing valve in accordance with a first preferred embodiment of the present invention.

FIG. 2 shows a hot and cold water mixing valve of the first preferred embodiment of the present invention. Although not shown, the hot and cold water mixing valve of the first preferred embodiment is provided with an outer casing used as an outer box, and a main body member in the shape of a cartridge which is removably engaged with and inserted into the outer casing. The main body member is assembled so that a control valve mechanism A may be accommodated in a cylindrical casing 1.

The casing 1 is provided with a cylindrical main body 1a, a cover member 1b which is in the shape of a cap, has a bottom, and is threadedly connected to one end side of the cylindrical main body 1a, and a cylindrical valve seat member 1c. A cylindrical middle case component 1d is attached to the other end side of the main body 1a.

The cover member 1b is threadedly engaged with the cylindrical main body 1a and the valve seat member 1c is threadedly engaged with the middle case component 1d attached to the main body 1a, so that the casing 1 is arranged to be hollow and cylindrical.

In particular, the main body 1a is formed in the shape of a cylinder where an upper half of the cylinder molded by processing a resin material, a metal material, etc., and a lower half of the cylinder are threadedly engaged and assembled at a junction. A male screw 15 is formed on the perimeter side at one end side (upper end side in FIG. 2) of the main body 1a. Further, a female screw 16 is formed at the inner circumference face of the middle case component 1d attached to the other end side (lower end side in FIG. 2) of the main body 1a. The female screw which is threadedly engaged with the male screw 15 formed at the main body 1a is formed at the inner circumference face of an open side (lower end side in FIG. 2) of the cover member 1b.

The male screw which is threadedly engaged with the female screw 16 formed at the middle case component 1d attached to the main body 1a is formed on the perimeter side at one end side of the valve seat member 1c (upper end side in FIG. 2).

Furthermore, a hot water inlet a and a cold water inlet b are formed and provided in parallel in an axial direction at a cylinder wall of the casing 1, and a hot water valve seat 10a is formed and provided in an inner position of the hot water inlet a. A cold water valve seat 10b formed inside the cold water inlet b is formed and provided at an inner end edge of the valve seat member 1c which is threadedly engaged with the middle case component 1d attached to the main body 1a.

As for the valve seat member 1c, its outer end side is formed in the shape of a basket, where a disk-like protection board 17 is provided at an axis site. Through holes which are radially opened constitute mixed water outlets c for mixed water. Further, as for the valve seat member 1c, an inner room of a cylindrical portion constitutes a mixing chamber 13 for mixing the hot water and cold water which flow in through the hot water inlet a and the cold water inlet b.

Furthermore, a guide hole 18 extending along an axial line direction is formed in the axis site of the disk-like protection board 17 provided for the valve seat member 1c. Still further, a spring bracket 71 is formed on an inner face side of the protection board 17.

The control valve mechanism A is provided with a control valve member 2, spring brackets 72 and 73, a biasing member 4 interposed between the two spring brackets 72 and 73, a spring bracket 70, a temperature sensitive spring 5 abutting against the spring bracket 70 to bias the control valve member 2, and a rod-like support member 6.

The control valve member 2 is formed as a cylindrical valve member, has a hot water valve 2a formed at one end edge (upper end edge in FIG. 6) of a cylinder wall of it, and has a cold water valve 2b formed at the other end edge. Further, a cylindrical shaft portion 20 is formed in the axis site of the control valve member 2.

The biasing member 4 is formed of a material having a fixed spring constant. The biasing member 4 urges the control valve member 2 towards the cold water valve seat 10b side through the spring bracket 72. In addition, the biasing member 4 may only be a biasing member which balances with the temperature sensitive spring 5, and be in any shape. However, the bias spring having a linear spring material formed into the shape of a coil is used in the presently preferred embodiment.

The temperature sensitive spring 5 is formed from a material having a spring constant which changes with temperature. Further, the temperature sensitive spring 5 urges the control valve member 2 towards the hot water valve seat 10a side through the spring bracket 70. In addition, the material of the temperature sensitive spring 5 is not particularly limited. However, one that is molded from a shape memory alloy can be used for the temperature sensitive spring 5, for example.

Furthermore, in this preferred embodiment, one that is constituted by a coil spring 5a having a wire rod wound to have a large diameter and a coil spring 5b having a wire material wound to have a small diameter is used for the temperature sensitive spring 5. The temperature sensitive spring 5 is used in a situation where two coil springs are combined into double coils arranged coaxially in parallel. In particular, in the state of the combined double coils, the temperature sensitive spring 5 is sandwiched by the spring bracket 70 and the spring bracket 71 formed at the valve seat member 1c.

The support member 6 formed in the shape of a shaft is slidably inserted through the cylindrical shaft portion 20 of the control valve member 2. Further, a lower end side of the support member 6 is slidably inserted into the guide hole 18 which extends along the axis line direction and is formed and provided at the axis site of the disk-like protection board 17 provided on the outer end side of the valve seat member 1c. Thus, the control valve member 2 is limited so that it may move only in the axial direction with respect to the casing 1.

Further, this support member 6 and the cylindrical shaft portion 20 of the above-mentioned control valve member 2 are coupled by means of a holding member 60, such as an E-shaped retaining ring, so as to move up together with the support member 6 when the control valve member 2 acts to rise, and to move down and be guided by the support member 6 when it is lowered. The spring bracket 70 formed in the shape of a disk is axially slidably fitted on the lower end side where this support member 6 projects downwards from the cylindrical shaft portion 20, so that an upper surface of the bracket may abut against a lower end face of the cylindrical shaft portion 20 of an axis portion of the control valve member 2 as the bracket moves upwards.

Further, the spring bracket 71 is formed on an inner face side of the disk-like protection board 17 provided on the outer end side of the valve seat member 1c. The coil spring 5a with a large diameter and the coil spring 5b with a small diameter which are combined into the above-mentioned double coils are mounted between this spring bracket 71 and the above-mentioned spring bracket 70. The thus mounted coil spring 5a and coil spring 5b bias the control valve member 2 through the spring bracket 70 by its spring pressure.

In addition, in the presently preferred embodiment, it is arranged that there is a difference between a response of the coil spring 5a having a large diameter and a response of the coil spring 5b having a small diameter.

In particular, as shown, a cylindrically formed cover 7 is provided between the large diameter coil spring 5a located outside and the small diameter coil spring 5b located inside. This cylindrical cover 7 shields the small diameter coil spring 5b from the flow of the mixed water which flows out of the mixed water outlet c through the inside of the mixing chamber 13, so that a difference may be provided where the response of the small diameter coil spring 5b is delayed from that of the outer diameter coil spring 5a.

The cylindrical cover 7 which adiabatically encloses the perimeter of the small diameter coil spring 5b is formed separately from the spring bracket 70 and its base end side is fitted to an engagement portion formed at the spring bracket 70, so that it is integrally coupled, but not exclusively, with the spring bracket 70 and is attached to and held by the casing 1.

For example, the spring bracket 70 is formed and molded from a resin material, during which time this cylindrical cover 7 may be molded from a resin material together with the spring bracket 70, so as to be formed integrally and contiguously with the spring bracket 70. By carrying out the integral molding in such a way, this cylindrical cover 7 may be held in a fixed state so as to prevent the casing 1 from swinging. Thus, not only the response of the small diameter coil spring 5b is delayed from the response of the large diameter coil spring 5a exposed to the flow of mixed water, but also when the large diameter coil spring 5a and the small diameter coil spring 5b which are combined in the shape of a double coil are expanded and contracted with a temperature change to perform control operation, it plays the role of the guide which leads the expansion and contraction of the spring correctly in the axial direction, to thereby allow the exact control operation of the control valve member 2.

In addition, in the above description, the situation is shown where the cylindrical cover 7 is formed integrally and contiguously with, but not exclusively, the spring bracket 70. For example, the cylindrical cover 7 may be formed integrally and contiguously with the spring bracket 71.

Further, the bias spring 4 which biases one end side (upper end side in FIG. 2) of the control valve member 2 is interposed between the two spring brackets 72 and 73 attached to the support member 6.

In particular, the lower spring bracket 72 is fitted to the upper half side of the support member 6 which projects upwards from the cylindrical shaft portion 20 of the control valve member 2, and a holding member 61 is attached to the lower side (control valve member 2 side) of the spring bracket 72. The lower spring bracket 72 limits a downward motion of the bias spring 4 with respect to the support member 6.

Further, the upper spring bracket 73 is fitted to the upper half side of the support member 6 which projects upwards from the cylindrical shaft portion 20 of the control valve member 2, and a holding member 62 is attached to the upper side (adjusting screw 8 side) of the spring bracket 73. The upper spring bracket 73 limits an upward motion of the support member 6 of the bias spring 4. Further, the bias spring 4 is interposed between and stretched across the upper and lower spring brackets 73 and 72. In addition, it is preferable that E-shaped retaining rings etc. are used for the holding members 61 and 62.

Further, an adjusting screw 8 and an adjusting screw shaft 9 are arranged on the upper surface side (face opposite to face supporting bias spring 4) of the spring bracket 73. The adjusting screw shaft 9 is threadedly engaged with a female screw formed at a rotationally inner circumference face of the adjusting screw 8, and its motion in a direction of rotation is limited by a spline slot 19 provided for the inner circumference face of the main body 1a. In addition, the adjusting screw 8 is arranged at the upper end in the cylindrical main body 1a, so that it may be rotated freely by operating the temperature adjusting dial (not shown). Furthermore, as for the adjusting screw shaft 9, an abutment portion 90 is formed on the upper end side, and an abutment portion 91 is formed on the lower end side.

When the adjusting screw shaft 9 is raised or lowered inside the main body 1a by rotation of the adjusting screw 8, the upper spring bracket 73 is depressed by the abutment portion 90 on the upper end side of the adjusting screw shaft 9. In this situation, the bias spring 4 being borne by the spring bracket 73 biases the control valve member 2 through the lower spring bracket 72, the holding member 61 in abutment to it, the support member 6 linked by it, and the holding member 60 which is provided for the support member 6 and in abutment to the upper end face of the cylindrical shaft portion 20 of the control valve member 2.

Further, the control valve mechanism A constituted by these is set up such that the control valve member 2 closes the hot water inlet a to discharge cold water, in a situation where the adjusting screw shaft 9 is pulled up by operation of the temperature adjusting dial (not shown). While, in a situation where the adjusting screw shaft 9 is depressed, it is set up such that the control valve member 2 closes the cold water inlet b to discharge very hot water.

Further, by operation of the temperature adjusting dial (not shown), the control valve mechanism A changes an opening/closing ratio between the hot water inlet a and the cold water inlet b, and adjusts a mixture ratio of the hot water which flows in through the hot water inlet a to the cold water which flows in through the cold water inlet b so that the mixed water having a temperature desired by a user may be discharged.

In a situation where a position of the control valve member 2 is set up so that the control valve mechanism A may discharge the mixed water at a preset temperature desired by the user (in addition, the opening/closing ratio between the hot water inlet a and the cold water inlet b depends on the preset temperature), if a flow rate of the cold water decreases because of a hydraulic pressure fall etc., with which the temperature of the mixed water in the mixing chamber 13 is increased, then the control valve mechanism A controls the control valve member 2 as follows.

In particular, in such a situation as described above, as the temperature of the mixed water in the mixing chamber 13 rises, the temperature sensitive spring 5 detecting it operates to increase a generating load. When the temperature sensitive spring 5 operates to increase the generating load, the biasing member 4 is compressed and the control valve member 2 is biased towards the hot water valve seat 10a side. Accordingly, a spacing between the hot water valve 2a and the hot water valve seat 10a becomes narrow, and the inflow of the hot water is reduced. Further, accordingly, the spacing between the hot water valve 2b and the cold water valve seat 10b becomes large, and the inflow of water is increased. As a result, the control valve mechanism A lowers the temperature of the mixed water.

Further, in a situation where the position of the control valve member 2 is set up so that the control valve mechanism A may discharge the mixed water at the desired preset temperature, if the flow rate of the inflow cold water increases with increasing hydraulic pressure etc. and the temperature of the mixed water in the mixing chamber 13 falls, then the control valve mechanism A controls the control valve member 2 as follows.

In particular, in the case where the flow rate of the inflow cold water increases with increasing hydraulic pressure etc. and the temperature of the mixed water in the mixing chamber 13 is lowered, the temperature sensitive spring 5 detects it and operates to reduce the generating load. When the temperature sensitive spring 5 operates to reduce the generating load, the biasing member 4 expands by the reduced load and biases the control valve member 2 towards the hot water valve seat 10b side. Accordingly, the spacing between the hot water valve 2a and the hot water valve seat 10a becomes large, and the inflow of hot water is increased. Further, accordingly, the spacing between the hot water valve 2b and the cold water valve seat 10b becomes narrow to reduce the flow rate of the cold water. Thus, the reduced temperature of the mixed water is raised.

In addition, the control operation of the control valve member 2 is performed by the temperature sensitive spring 5 divided into the large diameter coil spring 5a and the small diameter coil spring 5b, which are combined in the shape of a double coil. In this preferred embodiment, the response of the small diameter coil spring 5b is delayed from that of the large diameter coil spring 5a, so that a final stage of a step of closing the valve may be gradual and a pulsating flow may be prevented effectively. Further, the small diameter coil spring 5b leads to fine tuning, thus allowing exact control. In other words, the temperature sensitive spring 5a which is not covered with the cover 7 operates first so that the control valve member 2 is brought close to a predetermined position, and then the control valve member 2 is correctly located and positioned in a predetermined position by operation of the temperature sensitive spring 5b covered with the cover 7. Therefore, there is no hunting etc. and the exact control is attained.

Further, in the description of the above-mentioned preferred embodiment, in order to allow the difference between the response of the large diameter coil spring 5a and the response of the small diameter coil spring 5b, an example is illustrated, but not exclusively, in which the cover 7 for covering the small diameter coil spring 5b is provided.

As for the large diameter coil spring 5a and the small diameter coil spring 5b, their surfaces may be coated with a resin material, plated, etc., to thereby provide a difference in response by subjecting them to a process of changing the responses with a difference.

For example, a surface of the small diameter coil spring 5b located inside may only be coated while the large diameter coil spring 5a located outside is not coated with a resin material etc. Thus, the small diameter coil spring 5b is adiabatically shielded from the flow of the mixed water which passes through the inside of the mixing chamber 13 and flows out of the mixed water outlet c, to thereby provide the difference so that the response of the small diameter coil spring 5b may be delayed from that of the outer large diameter coil spring 5a.

Further, it is possible to provide a difference between the respective responses of the large diameter coil spring 5a and the small diameter coil spring 5b by arranging the temperature sensitive spring 5 as follows, for example. In other words, an alloy having a transformation range of 0-70° C. is used for a material of one of the two springs and an alloy having a transformation range of 50° C.-80° C. is used for a material of the other spring, to thereby allow the difference in response between the two springs. In the case where this arrangement is employed, one spring operates, then the other spring operates with a delay.

Then, a second preferred embodiment of the present invention will be described with reference to FIGS. 3-6. The first preferred embodiment is partly modified to give the second preferred embodiment. In addition, as for the description of the second preferred embodiment, the same reference numeral is assigned to a component having the same structure as that in the first preferred embodiment as described above. Further, the second preferred embodiment will be described focusing on a structure different from that of the first preferred embodiment as described above.

Figure 3:
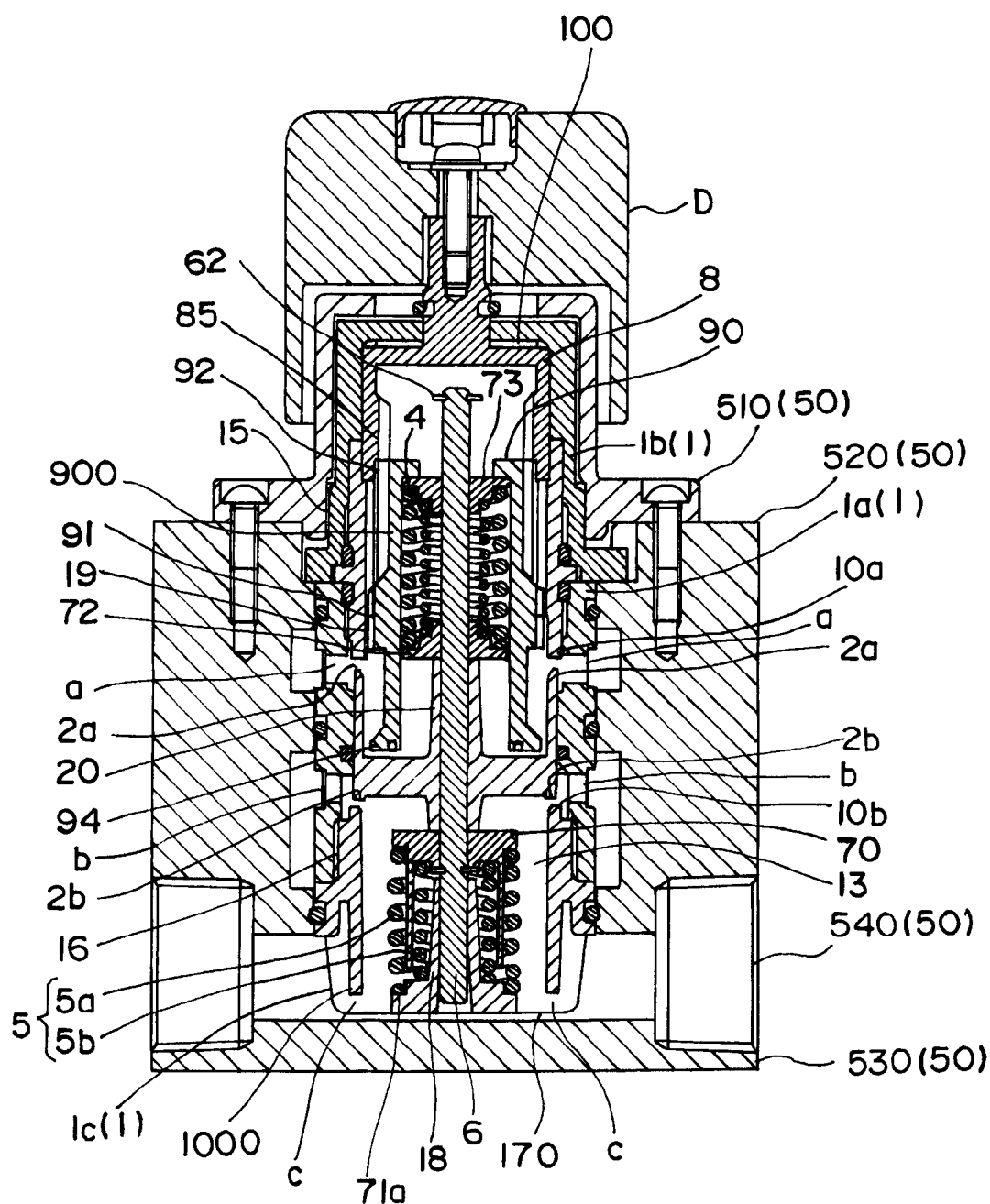
FIG. 3 A longitudinal sectional front view of a principal part of the hot and cold water mixing valve in accordance with a second preferred embodiment of the present invention.
Figure 4:
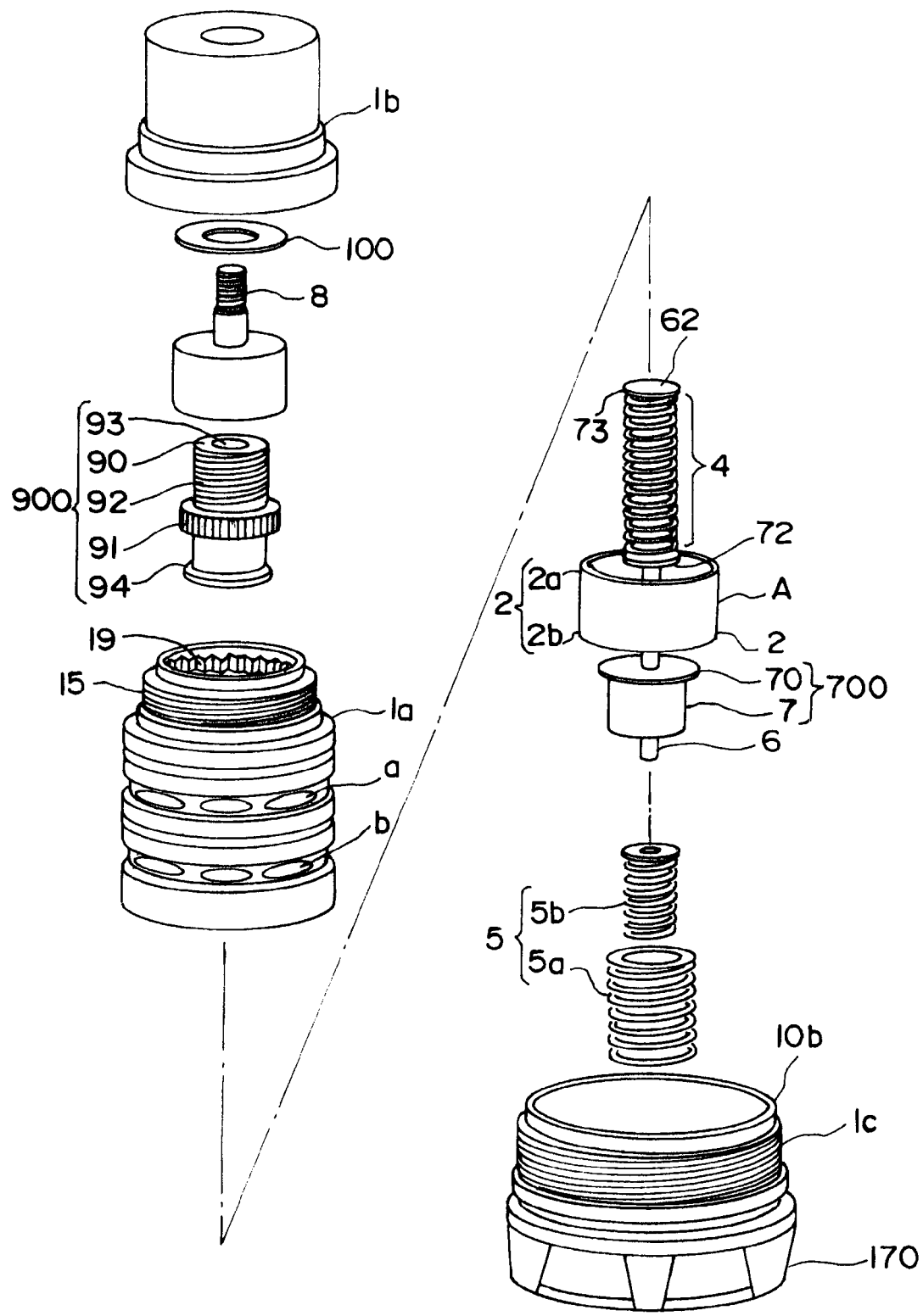
FIG. 4 A schematic view of the main components of the hot and cold water mixing valve in accordance with the second preferred embodiment of the present invention.
Figure 5:
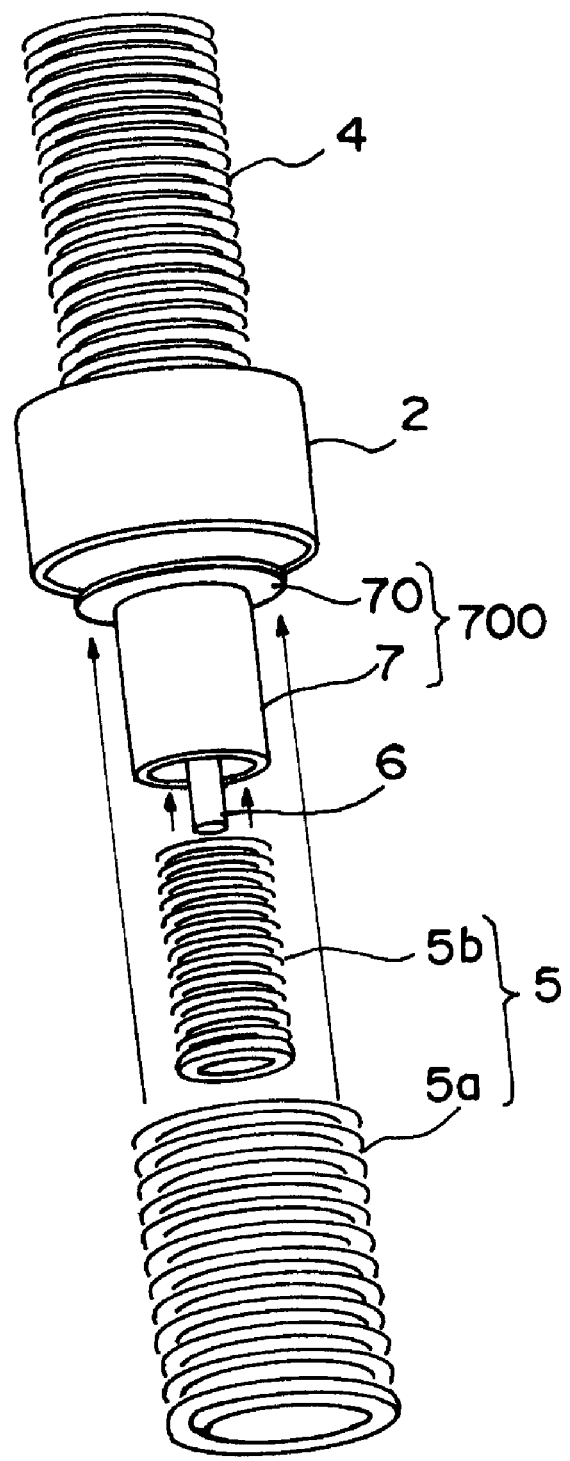
FIG. 5 A view for explaining a relationship between a spring holder and a temperature sensitive spring of the second preferred embodiment of the present invention.
Figure 6:
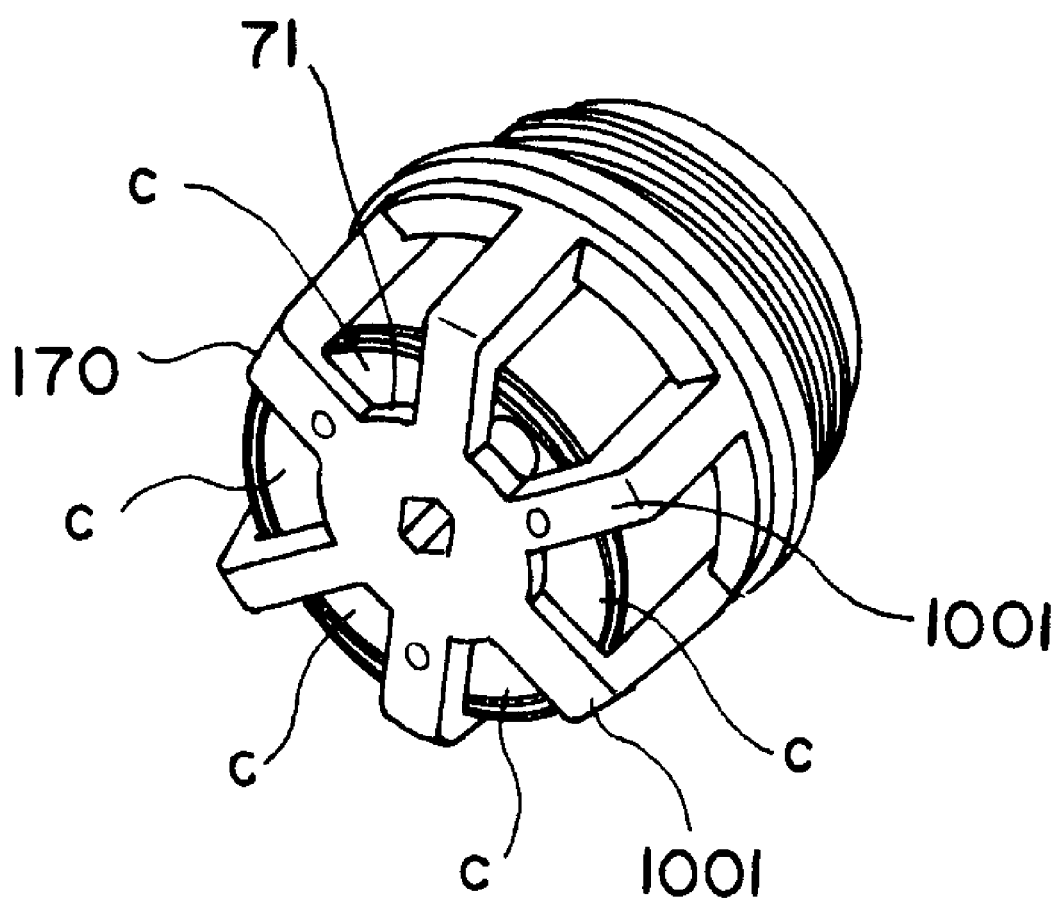
FIG. 6 A perspective view from below of a valve seat member which constitutes a casing of the second preferred embodiment of the present invention.

FIG. 3 is a longitudinal sectional view of the hot and cold water mixing valve in accordance with the second preferred embodiment of the present invention. FIG. 4 is a schematic view of the main components of the hot and cold water mixing valve in accordance with the second preferred embodiment of the present invention. FIG. 5 is a view for explaining a relationship between a spring holder and a temperature sensitive spring of the second preferred embodiment of the present invention. FIG. 6 is a schematic perspective view from below of a valve seat member which constitutes a casing of the second preferred embodiment of the present invention.

The second preferred embodiment is characterized in that an end on the control valve member 2 side of an adjusting screw shaft 900 is provided with a tapered skirt portion 94 whose lower end spreads in a radial direction (see FIGS. 3 and 4). In addition, a size in an axial direction of the adjusting screw shaft 900 is a length allowing the skirt portion 94 to be arranged at least at a hot water side channel, from the hot water inlet a to the mixing chamber 13, when the adjusting screw shaft 900 is incorporated into the casing 1.

The skirt portion 94 of this adjusting screw shaft 900 gradually reduces a hot water inflow area of the hot water side channel from the hot water inlet a to the mixing chamber 13, effluent resistance (pressure loss) of the hot water passage is increased, and the flow rate is decreased. Accordingly, the influence of operation on the control valve member by the inflow hot water is reduced, thus improving accuracy in temperature control at the hot and cold water mixing valve.

Further, the second preferred embodiment is characterized by employing a structure in which a tip portion of a cylindrical portion 1000 formed at the valve seat member 1c is extended to an end (end which faces spring bracket 71 of temperature sensitive spring 5) of the temperature sensitive spring 5 (see FIG. 3).

Since this structure allows the mixed water to flow into the mixed water outlet c after passing by the end of temperature sensitive spring 5, the mixed water can be prevented from being discharged except that its temperature is not detected by the temperature sensitive spring 5. Accordingly, it is possible to improve accuracy in temperature detection at the temperature sensitive spring 5. Further, since the hot and cold water mixing valve of this preferred embodiment allows the discharge in a circumferential direction, a size in a longitudinal direction (axial direction) of the whole equipment can be reduced by means of the above-mentioned structure and a sufficient flow rate can be ensured.

Hereafter, the second preferred embodiment will be described in detail.

First, the whole structure of the second preferred embodiment will be described. As shown in FIG. 3, the hot and cold water mixing valve is provided with a cartridge-like main body member and an outer casing 50 which serves as an outer box of the main body member like the first preferred embodiment as described above. The main body member is assembled so that the control valve mechanism may be accommodated in the cylindrical casing 1 (main body 1a, cover member 1b, valve seat member 1c). Further, the main body member is used by being inserted into the outer casing 50.

As shown in FIG. 3, the outer casing 50 is constituted by a cylindrical component 520 provided with an upper lid component 510 and a bottom part 530. The main body member is inserted into the cylindrical component 520, so that the valve seat member 1c may face the bottom part 530, and the cover member 1b is screwed and covered with the upper lid component 510. A temperature adjusting dial D is fixed on the upper lid component 510.

Further, a channel where the mixed water discharged from the mixing-chamber outlet c of the hot and cold water mixing valve flows is formed on the bottom part 530 side of the cylindrical component 520. In particular, the channel is constituted by the bottom part 530 which faces the valve seat member 1c and a slot 540 formed in the shape of a substantial circumference on an upper side (side which faces valve seat member 1c) of the bottom part 530. The thus arranged outer casing 50 allows the mixed water discharged from the mixing-chamber outlet c of the valve seat member 1c to be discharged in a direction orthogonal to the axial direction of the hot and cold water mixing valve (circumferential direction of hot and cold water mixing valve). Further, this arrangement can reduce a lengthwise size in the longitudinal direction of the hot and cold water mixing valve.

Next, among the structures of the casing 1 of the second preferred embodiment, a structure of the valve seat member 1c modified from the first preferred embodiment will be described.

As shown in FIGS. 3 and 6, the valve seat member 1c has the cylindrical portion 1000 and a valve seat holding portion 170 formed at one end of the valve seat member 1c. Further, the valve seat holding portion 170 is constituted by a disk-shaped spring bracket 71 arranged at an axis site of the valve seat member 1c, ribs 1001 extending in the diameter direction of the spring bracket 71, and a plurality of mixed water outlets c formed on a perimeter side of the spring bracket 71. The rib 1001 is connected with the cylindrical portion 1000 of the valve seat member 1c.

The valve seat member 1c is arranged so that the tip portion of the cylindrical portion 1000 may be in a position substantially parallel with a surface (which supports coil spring 5a) of a spring-bearing part 71a. In other words, a distance of a gap (gap size in axial direction of casing 1) between the tip portion of the cylindrical portion 1000 and a bottom of the spring bracket 71 has substantially the same size as a height size (height size from bottom of spring bracket 71 to surface which supports temperature sensitive spring 5a) of the surface (which supports temperature sensitive spring 5a) of the spring bracket 71.

This structure allows the hot water and cold water which flow into the mixing chamber 13 to be mixed in the mixing chamber 13 and discharged from the mixed water outlet c after passing by the end of the temperature sensitive spring 5 disposed at the spring bracket 71. In other words, according to this structure, the mixed water can be prevented from being discharged from the mixed water outlet c except that its temperature is not detected by the temperature sensitive spring 5. Further, according to the above-mentioned structure, since an amount (time) of contact of the mixed water with the temperature sensitive spring 5 can be changed by changing the length of the cylindrical portion 1000, it is also possible to vary temperature sensitivity of the temperature sensitive spring 5.

Next, the main components of the hot and cold water mixing valve of the second preferred embodiment will be described.

As shown in FIG. 4, the hot and cold water mixing valve is provided with the casing 1 (main body 1a, cover member 1b, valve seat member 1c). The casing 1 incorporates a washer 100 sandwiched between the cover member 1b and the adjusting screw 8, the adjusting screw 8, the adjusting screw shaft 900 which is threadedly engaged with the adjusting screw 8, the control valve member 2 formed as a cylindrical valve member, in which one end edge (upper end edge in FIG. 4) of its cylinder wall has formed thereon the hot water valve 2a, and the other end edge has formed thereon the cold water valve 2b, the biasing member 4, two spring brackets 72 and 73 for supporting the biasing member 4, the temperature sensitive spring 5, the spring holder 700 for holding an end (upper side in FIG. 4) of the temperature sensitive spring 5, and the support member 6.

In addition, in the description of the second preferred embodiment, the adjusting screw 8 and the control valve member 2, the biasing member 4, the temperature sensitive spring 5, and the support member 6 which have the same structures as those in the first preferred embodiment will not be described in detail.

Next, the adjusting screw shaft 900 will be described which is a characteristic structure of this preferred embodiment.

The adjusting screw shaft 900 is formed cylindrically. One end of the adjusting screw shaft 900 is open and a support portion 90 in abutment to the spring bracket 73 which supports the biasing member 4 is formed at other end. A hole 93 is provided in the central part of the support portion 90.

Formed on a perimeter face at the other end of the adjusting screw shaft 900 is a male screw 92 which is threadedly engaged with a female screw 85 (FIG. 3) formed at a cylindrical inner circumference of the adjusting screw 8. Formed at the perimeter face in the substantially center in the axis direction of the adjusting screw shaft 900 is a slot 91 which is fitted to a spline slot 19 formed at the inner circumference face of the main body 1a. Further, the tapered skirt portion 94 whose lower end spreads in the radial direction is formed at one end of the adjusting screw shaft 900.

Further, as shown in FIG. 3, an axial size of the adjusting screw shaft 900 is a length in which the skirt portion 94 is located at the hot water side channel, from the hot water inlet a to the mixing chamber 13, when it is incorporated into the casing 1.

The reason for providing the hot water passage with the skirt portion 94 as described above is to prepare an obstacle in the hot water passage and to reduce a flow rate of the hot water in direct contact with the control valve member 2. Thus, it is possible to reduce influence of operation on the control valve member caused by the flowing hot water, and improve accuracy in temperature control.

Further, since the skirt portion 94 is provided for the hot water passage, it is possible to cause turbulence before mixing the hot and cold water. Therefore, subsequent mixing of the hot and cold water is promoted. As a result, a detection temperature of the temperature sensitive spring 5 can be obtained appropriately.

Furthermore, the force (pressure) of the hot water flowing toward the mixing chamber 13 can be reduced by providing the hot water passage with the skirt portion 94 causing effluent resistance (pressure loss). Therefore, according to this preferred embodiment, even if the pressure of the hot water which flows in through the hot water inlet a rises rapidly, the flow rate of the hot water which flows into the mixing chamber 13 is controlled by the skirt portion 94. Thus, it is possible to shorten a travel distance with which the control valve member 2 may widen the cold water valve side (travel distance in order to widen the spacing between the cold water valve 2b and the cold water valve seat 10b), (temperature control can be performed in a short time). In other words, according to this preferred embodiment, by providing the skirt portion 94 which causes effluent resistance (pressure loss), it is possible to reduce the influence by fluctuations in hot water pressure, thus improving temperature control performances.

Still further, the flow rate of the hot water which flows into the mixing chamber 13 can be limited by providing the hot water passage with the skirt portion 94 which causes effluent resistance (pressure loss), (since the area between the tip portion of the skirt portion 94 and the inner wall of casing 1 is constant). Therefore, even if the hot water pressure increases rapidly, the hot water of a predetermined flow rate or more does not flow into the mixing chamber 13. Accordingly, it is possible to prevent sudden operation of the temperature sensitive spring 5 due to the rapid increase in the flow rate of the hot water. Thus, according to this preferred embodiment, the hunting in which overshoot and undershoot are repeated may not occur easily, to thereby improve the accuracy in temperature control.

Next, a structure of the spring holder 700 will be described with reference to FIGS. 3 and 4.

The spring holder 700 is provided with the spring bracket 70 which supports the temperature sensitive spring 5, and the cylindrical cover 7 is formed at one surface (surface for supporting temperature sensitive spring 5) of the spring bracket 70. This cylindrical cover 7 is formed of a resin material integrally and contiguously with the spring bracket 70 by molding it together with the spring bracket 70, for example.

The spring holder 700 is slidably fitted to the shaft-like support member 6 which is inserted through the cylindrical shaft portion 20 of the control valve member 2 so that an upper surface (surface opposite to surface which supports temperature sensitive spring 5) of the spring bracket 70 may be in abutment to the lower end face of the cylindrical shaft portion 20 of an axis portion of the control valve member 2 (see FIG. 3). Further, the control valve member 2 and the spring holder 700 are engaged with the support member 6 by means of the holding members 60, such as E-shaped retaining ring, in a situation where the upper surface of the spring bracket 70 is in abutment to the lower end face of the cylindrical shaft portion 20 of the axis portion of the control valve member 2.

Now, as shown in FIG. 5, a relationship between the spring holder 700 and the temperature sensitive spring 5 will be described. As shown, the large diameter coil spring 5a is inserted at the perimeter side of the cover 7 of the spring holder 700, and the small diameter coil spring 5b is inserted at the inner circumference side of the cover 7. The coil spring 5a and the small diameter coil spring 5b are provided between the spring bracket 70 and the bracket 71 of the valve seat member 1c, so that the coil spring 5a and coil spring 5b bias the control valve member 2 by spring pressure through the spring bracket 70.

Figure 7:
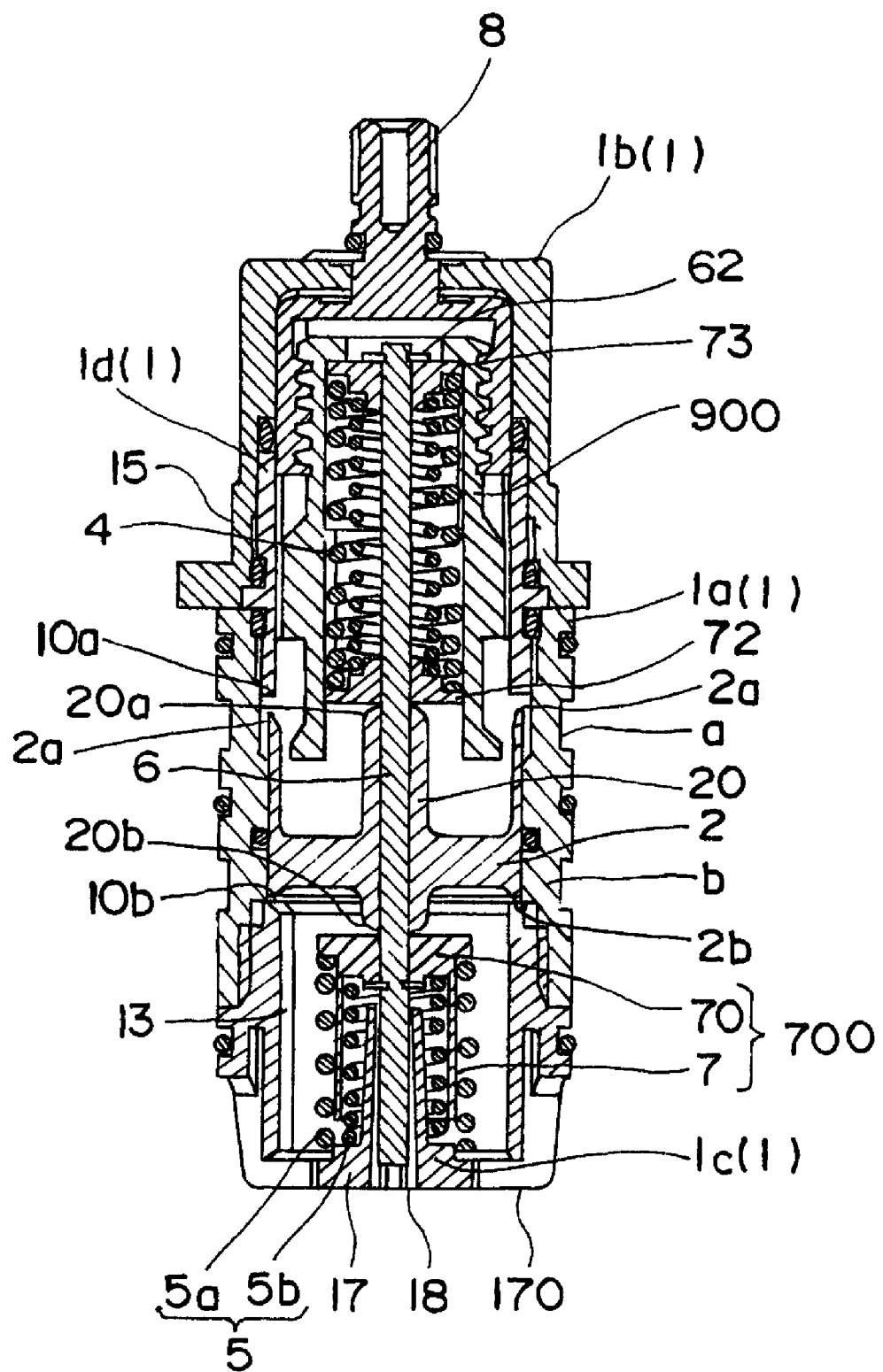
FIG. 7 A view for explaining a modification of the control valve member of the hot and cold water mixing valve in accordance with the second preferred embodiment of the present invention.

In addition, the cylindrical shaft portion 20 of the control valve member 2 in accordance with the second preferred embodiment of the present invention may be modified to a shape as shown in FIG. 7.

FIG. 7 is a view showing a modification of the control valve member 2 in accordance with the second preferred embodiment of the present invention.

As shown, perimeter portions of an abutment surface 20a in abutment with the spring bracket 72 at one end side of the cylindrical shaft portion 20 of the control valve member 2 are beveled as planes to form so-called C-chamfers. Further, perimeter portions of the abutment surface 20b in abutment with the spring bracket 70 at the other end side of the cylindrical shaft portion 20 are beveled as planes to form so-called C-chamfers. The reasons for employing such a structure are as follows.

In particular, as for the hot and cold water mixing valve, the support member 6 may incline in the case of opening/closing the control valve member 2. If this support member 6 inclines, then the control valve member 2, the spring bracket 72, and the spring bracket 70 which are supported by the support member 6 also incline. Further, the control valve member 2 is subjected to a load from the biasing member 4 through the spring bracket 72 and subjected to a load from temperature sensitive spring 5 through the spring bracket 70, so that it may be subjected to a load in a leaning direction, if the spring bracket 72 and the spring bracket 70 incline. In other words, if the support member inclines, then the control valve member 2 not only inclines but also is influenced by the load from the first spring bracket and the second spring bracket.

There is a problem that when the hot water valve seat 10a (or cold water valve seat 10b) is closed, if the load is applied to the control valve member 2 in an inclined direction from the spring bracket 72 and the spring bracket 70, the hot water valve 2a (or cold water valve 2b) may not be evenly contiguous with the hot water valve seat 10a (or cold water valve 10b), to cause hot water leakage (or cold water leakage) at the hot and cold water mixing valve.

Then, in the present invention, according to the structure as described above, an area where the control valve member 2 is in abutment with the spring bracket 72 and an area where the control valve member 2 is in abutment with the spring bracket 70 are arranged to be small, so as to reduce the effects caused by inclination of the support member 6 of the control valve member 2. Thus, according to the present invention, when closing the hot water valve seat 10a (or cold water valve seat 10b), a possibility that the hot water leakage (or cold water leakage) may occur can be reduced.

In addition, since motion of the control valve member 2 is limited by the inner circumference face of the casing 1, it is not influenced, even if the support member 6 inclines and the spring brackets (70, 72) incline.

In addition, although the above description is carried out in the case where the perimeter portions of the abutment surfaces 20a and 20b are beveled as planes, the perimeter portions of the abutment surfaces 20a and 20b may be beveled as curved surfaces, and it is possible to form so-called R-surfaces.

Further, although the above description is carried out in the case where the perimeter portions of the abutment surfaces 20a and 20b are beveled, it is not particularly limited thereto. The above-mentioned abutment surfaces (20a, 20b) may only be subjected to a process of reducing the areas in contact with the spring brackets (72, 70). Further, for example, at a molding stage, the abutment surfaces 20a and 20b of the control valve member 2 may be molded beforehand in the shape which allows the areas in contact with the spring brackets (72, 70) to be reduced.

As described above, according to the first-second preferred embodiments of the present invention, the temperature sensitive spring whose spring constant changes with temperature can prevent hunting and improve the accuracy of temperature control in the mixing valve apparatus for controlling the temperature of the mixture of hot and cold water by biasing the movable valve member for changing the mixture ratio of the hot water to the cold water.

In addition, the present invention is not limited to the preferred embodiments as described above, and various modifications can be made within the scope of the present invention.

For instance, in the above preferred embodiments, although the example is shown in which the temperature sensitive spring 5 is used as the temperature sensitive actuator, the present invention is not limit thereto. It may only be one that expands and shrinks according to a temperature change.

The invention claimed is:

1. A hot and cold water mixing valve, comprising:
a temperature adjusting dial which is subjected to temperature control operation, and
a main body member having a control valve mechanism for adjusting temperatures of hot water and cold water by operating said temperature adjusting dial and a casing in which a hot water inlet and a cold water inlet are formed and said control valve mechanism is accommodated, wherein
said main body member comprises:
a biasing member made of a material having a fixed spring constant,
a temperature sensitive spring which expands or shrinks according to a temperature change, and
a control valve member in which a first spring bracket for supporting said biasing member is abutted against one end, and a second spring bracket for supporting said temperature sensitive spring is abutted against the other end, and an opening/closing ratio between said hot water inlet and said cold water inlet is changed by balancing between the loads applied by said biasing member and said temperature sensitive spring, to adjust a mixture ratio between the hot water which flows in through said hot water inlet and the cold water which flows in through said cold water inlet, and wherein
a mixing chamber for mixing the cold water from said cold water inlet and the hot water from said hot water inlet is provided inside said casing, and a third spring bracket for supporting said temperature sensitive spring is formed in said mixing chamber,
said temperature sensitive spring is constituted by a coil-like large diameter coil spring wound to have a large diameter and a coil-like small diameter coil spring wound to have a small diameter, and said large diameter coil spring and said small diameter coil spring are arranged so that their axes are coaxial or in parallel, and supported between said second spring bracket and third spring bracket, and
a cylindrical cover surrounding a perimeter side of said small diameter coil spring is formed integrally or substantially integrally with said second spring bracket or the third spring bracket, the perimeter side of said small diameter coil spring is enclosed with the cover on an inner circumference side of said large diameter coil spring, and a response of expansion/shrink operation according to the temperature change of said large diameter coil spring and a response of expansion/shrink operation according to the temperature change of said small diameter coil spring are differentiated.

2. The hot and cold water mixing valve as claimed in claim 1, wherein said second spring bracket and said cover are formed of a resin material.

3. The hot and cold water mixing valve as claimed in claim 1, wherein
a valve seat holding portion is formed at one end of said casing,
said valve seat holding portion is provided with a cylindrical portion, said third spring bracket is shaped like a disk and arranged on a tip portion side of said cylindrical portion and in an axial center part of said casing, a rib which extends in a diameter direction of said third spring bracket and is connected with said cylindrical portion, and a plurality of holes formed on the perimeter side of said third spring bracket,
the mixing chamber communicates with said hot water inlet and said cold water inlet is formed inside one end of said casing, and mixed water mixed in said mixing chamber is discharged from said holes, and a distance of a gap between the tip portion of said cylindrical portion and a bottom of said third spring bracket is arranged to be substantially the same as a height of a surface which supports the temperature sensitive spring of said third spring bracket.

4. The hot and cold water mixing valve as claimed in claim 1, wherein the control valve member includes a cylindrical valve portion which is incorporated inside said casing and movable in an axial direction of said casing, and has a hot water valve formed at its one end edge and a cold water valve formed at its other end edge, and a cylindrical shaft portion formed in the axial center part of said valve portion, and an abutment surface, abutting said first spring bracket, of the cylindrical shaft portion of said control valve member, and/or an abutment surface, abutting said second spring bracket, of the cylindrical shaft portion of said control valve member are subjected to a process of reducing a contact area.

\* \* \* \* \*